United States Patent
Kitamura et al.

(10) Patent No.: US 6,763,552 B1
(45) Date of Patent: Jul. 20, 2004

(54) SHAFT LOCK DEVICE

(75) Inventors: Yoshiharu Kitamura, Komagane (JP); Makoto Saitoh, Komagane (JP); Eiji Watadani, Komagane (JP); Hiroshi Ikeda, Komagane (JP); Naohiko Otake, Komagane (JP)

(73) Assignee: NHK Spring Co., Ltd., Kanagawa (JP)

( * ) Notice: Subject to any disclaimer, the term of this patent is extended or adjusted under 35 U.S.C. 154(b) by 5 days.

(21) Appl. No.: 10/009,634

(22) PCT Filed: Jun. 15, 2000

(86) PCT No.: PCT/JP00/03903

§ 371 (c)(1),
(2), (4) Date: Sep. 24, 2002

(87) PCT Pub. No.: WO00/77413

PCT Pub. Date: Dec. 21, 2000

(Under 37 CFR 1.47)

(30) Foreign Application Priority Data

Jun. 15, 1999 (JP) ......................................... H11-168578

(51) Int. Cl.[7] .............................................. E05C 11/08
(52) U.S. Cl. .............................. 16/337; 16/340; 16/330
(58) Field of Search .......................... 16/337–340, 330, 16/327; 403/103, 111, 120; 361/707, 711, 680–683; 248/920–923

(56) References Cited

U.S. PATENT DOCUMENTS

| 454,289 | A | * | 6/1891 | Partz | 411/155 |
|---|---|---|---|---|---|
| 1,016,798 | A | * | 2/1912 | Thomson | 411/155 |
| 1,095,039 | A | * | 4/1914 | Spencer | 411/129 |
| 3,628,584 | A | * | 12/1971 | Gutshall | 411/155 |
| 3,992,974 | A | * | 11/1976 | Miki et al. | 411/544 |
| 5,022,778 | A | | 6/1991 | Lu | |
| 5,269,047 | A | * | 12/1993 | Lu | 16/340 |
| 5,702,197 | A | * | 12/1997 | Chen | 403/166 |
| 5,772,351 | A | * | 6/1998 | Ching | 403/111 |
| 5,894,633 | A | * | 4/1999 | Kaneko | 16/306 |
| 5,913,351 | A | * | 6/1999 | Miura | 16/340 |
| 5,937,482 | A | * | 8/1999 | Horng | 16/340 |
| 5,970,580 | A | * | 10/1999 | Katoh | 16/337 |
| 6,154,925 | A | * | 12/2000 | Miura | 16/338 |
| 6,163,928 | A | * | 12/2000 | Chung | 16/342 |
| 6,168,342 | B1 | * | 1/2001 | Wu | 403/119 |
| 6,170,039 | B1 | * | 1/2001 | Kishida | 711/127 |
| 6,361,257 | B1 | * | 3/2002 | Grant | 411/154 |

FOREIGN PATENT DOCUMENTS

| JP | 3011568 | | 3/1995 |
|---|---|---|---|
| JP | 10-26126 | | 1/1998 |
| JP | 10-26127 | * | 1/1998 |
| JP | 2000-8688 A | * | 1/2000 |
| JP | 2000-297574 | * | 10/2000 |
| JP | 2001-12451 A | * | 1/2001 |
| JP | 2001-99133 A | * | 4/2001 |
| JP | 2001-107941 A | * | 4/2001 |

* cited by examiner

Primary Examiner—Chuck Y. Mah
(74) Attorney, Agent, or Firm—Lowe Hauptman Gilman & Berner, LLP

(57) ABSTRACT

A shaft lock apparatus, whose tilt angle between the apparatus's shaft and its rotating member is adjusted by a stable friction torque, and whose structure is simple. It is furnished with a rotating member (2) through which a shaft (1) passes in a condition of free rotation, and with elastic pressure members (3) and (4) through which the shaft (1) passes in a condition of bound rotation so as to keep the angle between the rotating member (2) and the shaft (1) at a desired degree by pressing against the rotating member (2).

5 Claims, 20 Drawing Sheets

SHAFT LOCK DEVICE

FIELD OF THE INVENTION

The present invention relates to a shaft lock apparatus that is included in a member, such as a display device of a notebook personal computer, a notebook word processor, a mobile terminal apparatus, or an LCD monitor, or a rotatable lid of various machines, or the like, whose tilt angle is necessary to be adjusted.

BACKGROUND OF THE INVENTION

FIG. 21 illustrates a conventional shaft lock apparatus stated in Japanese Utility Model Publication No. 2547422. This shaft lock apparatus is composed of a slider washer 110, a rotating member 120, a friction washer 130, a spring washer 140, and a retaining washer 150, all of which are coaxially installed onto a shaft 100. Moreover, in the rotating member 120 there is formed a fitting plate 123, which is to be affixed to the main body of the device supporting a display panel or the like so as to be capable of being rotated.

The shaft 100 is furnished with a flange 101, a fitting-axis portion 102 that extends from one side of the flange 101 and whose tip end is noncircular in shape, and a connecting-axis portion 103 that extends from the other side of the flange 101 and that is circular shaped. This shaft 100, whose fitting-axis portion 102 is attached to a mating member, such as a display panel, rotates with the rotation of the mating member as one united body.

The connecting-axis portion 103 passes through the slider washer 110, the rotating member 120, the friction washer 130, the spring washer 140, and the retaining washer 150, and in each of the slider washer 110, the rotating member 120, the friction washer 130, the spring washer 140, and the retaining washer 150, the axial holes 111, 121, 131, 141, and 151 are formed so that the aforementioned the connecting-axis portion can pass through them. By caulking the passing-end portion of the connecting-axis portion 103 that passes through these members, the slider washer 110, the rotating member 120, the friction washer 130, the spring washer 140, and the retaining washer 150 are put together in such a way that the spring washer 140 and the retaining washer 150 closely contact with each other, being subject to pressure by the spring washer 140. Because this pressure produces friction torque, the shaft 100 and the rotating member 120 are held at any intended angle, and as a result the tilt angle of the display panel can be adjusted.

In such a conventional shaft lock apparatus, it is not specified which member rotates, because any member can rotate against the shaft 100 at the time of the relative rotation of the shaft 100 and the rotating member 120. Consequently, the region where friction arises cannot be specified, and the friction torque varies in the different rotating members. This makes it impossible to secure stable friction torque. Also, because of the complicated structure of the apparatus, the number of the members that cause friction torque is large and it is difficult to assemble the apparatus.

The object of the present invention, based on the consideration of the aforementioned problems of the conventional apparatus, is to provide a shaft lock apparatus that is capable of causing stable friction torque and that is capable of keeping any intended tilt angle by a simple structure.

SUMMARY OF THE INVENTION

In order to achieve the above-mentioned object, the invention set forth in claim 1 is characterized such that it consists of:

(1) a rotating member, through which the shaft passes in a condition of free rotation, and
(2) an elastic pressure member that has (a) a belt-like flat portion of a specified width, and (b) rising portions that bend in the same direction from both sides of the flat portion, and whose flat portion is arranged in a direction such that the flat portion directly contacts the rotating member, or
(3) an elastic pressure member that has a curved shape, and is arranged in such a way that its central part directly contacts the rotating member; and such that it is furnished with
(1) said elastic pressure member, through which the aforementioned shaft passes, and which keeps the angle between the rotating member and the shaft at any desired degree by pressing the rotating member; and
(2) a retaining plate, through which the aforementioned shaft passes under a condition such that the shaft's rotation is restricted, and which presses said elastic pressure member onto the rotating member.

In this invention, because the rotation of the elastic pressure member is bound against the shaft, the elastic pressure member rotates as one united body with the shaft when the relative rotation of the shaft and the rotating member occurs. In this rotation, the angle between the rotating member and the shaft can be kept at any desired degree because the friction torque arises due to the elastic pressure member pressing against the rotating member. In such a structure, it is possible to stabilize the friction torque because the elastic pressure member always rotates together with the shaft. In addition, because the number of the parts is small the structure is simple, and therefore assembly is easy.

The elastic pressure member in this invention is either (1) an elastic pressure member that has (a) a belt-like flat portion of a specified width, and (b) rising portions that bend in the same direction from both ends of the flat portion, and that is arranged in such a direction that its flat portion directly contacts the rotating member, or
(2) an elastic pressure member that has a curved shape, and is arranged in such a way that its central part directly contacts the rotating member.

When the elastic pressure member that has rising portions on both sides of its flat portion presses against the rotating member, the borders between the flat portion and the rising portions linearly contact the rotating member, whereby friction torque is produced. By this linear contact, the desired contact length can be ensured, and stable friction torque also can be obtained because the two portions on the two sides of the flat portions contact the rotating member. When the shaft rotates under this condition, the elastic pressure member rotates together with the shaft, and therefore the borders of the flat portion and the rising portions whirl around the shaft. Thus, because the borders of the flat portion and the rising portions contact with the rotating member in a circle track, the area of contact between the rotating member and the elastic pressure member increases, whereby abrasion of the two members is decreased and their durability improves.

In the case of an elastic pressure member that has a curved shape, its central part contacts the rotating member in such a way that the shape of the contacting area becomes circular, whereby friction torque is produced. Therefore, stable friction torque can be obtained. In this case, when the shaft rotates, the elastic pressure member rotates together with the shaft as one body, where the contact area between the shaft and the elastic pressure member has a circular shape, so the friction between the two members is decreased and their durability is improved.

The invention set forth in claim 4 is characterized such that it consists of
(1) a rotating member, through which the shaft passes in a condition of free rotation, and
(2) an elastic pressure member that has (a) a belt-like flat portion of a specified width, and (b) rising portions that bend in the same direction from both sides of the flat portion, and whose flat portion is arranged in such a direction that the flat portion directly contacts the rotating member, or
(3) an elastic pressure member that has a curved shape and that is arranged in such a way that its central part directly contacts the rotating member; and such that it is furnished with
(1) an elastic pressure member, through which the aforementioned shaft passes under a condition such that the shaft's rotation is bound, and which keeps the angle between the rotating member and the shaft at any desired degree by pressing against the rotating member;
(2) a friction plate through which the aforementioned shaft passes under a condition such that the shaft's rotation is bound, and that is superposed on the aforementioned rotating member, and
(3) a retaining plate through which the aforementioned shaft passes under a condition such that the shaft's rotation is bound, and that presses against said elastic pressure member onto the rotating member.

This invention includes a structure such that either (1) the friction plate is placed between the shaft and the rotating member and the elastic pressure member is placed so that the rotating member is placed between the elastic member and the friction plate, or (2) the elastic pressure member is placed between the shaft and the rotating member and the friction plate is placed so that the rotating member is placed between the friction plate and the elastic pressure member.

In the invention set forth in claim 4, the elastic pressure member and the friction plate rotate together with the shaft as one united body in the relative rotation of the shaft and the rotating member. Consequently, friction torque arises between the elastic member and the rotating member while friction torque arises between the friction plate and the rotating member. Accordingly, it is possible to stabilize the fiction torque because extensive friction torque arises. Also, because of the small number of the parts, a simple structure is enabled. In addition, because the friction plate is furnished, durability improves.

In this invention, the elastic pressure member is either
(1) an elastic pressure member that has (a) a belt-like flat portion of a specified width, and (b) rising portions that bend in the same direction from both sides of the flat portion, and that is arranged in a direction such that its flat portion directly contacts the rotating member, or
(2) an elastic pressure member that has a curved shape and that is arranged in such a way that its central part directly contacts the rotating member.

Therefore, the area of the contact between the elastic pressure member and the rotating member is large, so that friction torque is stabilized and the abrasion of the two members is decreased and their durability improves, just as the invention set forth in claim 1.

The invention set forth in claim 5 is characterized such that it consists of
(1) a friction plate, through which the shaft passes in a condition of bound rotation;
(2) a rotating member, through which the shaft passes in a condition of free rotation;
(3) an elastic pressure member that has (a) a belt-like flat portion of a specified width, and (b) rising portions that bend in the same direction from both sides of the flat portion, and that is arranged in a direction such that its flat portion directly contacts the rotating member, or
(4) an elastic pressure member that has a curved shape and that is arranged in such a way that its central part directly contacts the rotating member; and such that it is furnished with
(1) said elastic pressure member, through which the shaft passes in a condition of bound rotation; and
(2) a retaining plate, through which the shaft passes in a condition of bound rotation;
and such that all of which are fit together in piles on the shaft in such a consecutive order; and
such that by caulking the passing end of the shaft that passes through the retaining plate, the angle between the rotating member and the shaft is kept at any desired degree by the elastic pressure member pressing against the rotating member.

In this invention the friction plate, the rotating member, the elastic pressure member, and the retaining member are in a superposed condition by caulking the passing end of the shaft after the friction plate, the rotating member, the elastic pressure member, and the retaining member are fit on the shaft in the aforementioned consecutive order. Under this condition, because the friction plate and the elastic pressure member rotate together with the shaft, friction torque arises between the elastic pressure member and the rotating member while friction torque arises between the friction plate and the rotating member. Accordingly, the friction torque is stabilized, and the angle between the rotating member and the shaft can be maintained with certainty.

In this invention, the elastic pressure member is either
(1) an elastic pressure member that has (a) a belt-like flat portion of a specified width, and (b) rising portions that bend in the same direction from both sides of the flat portion, and that is arranged in a direction such that its flat portion directly contacts the rotating member, or
(2) an elastic pressure member that has a curved shape and that is arranged in such a way that its central part directly contacts the rotating member.

Therefore, the area of the contact between the elastic pressure member and the rotating member becomes large, and therefore friction torque is stabilized, the friction between the members is decreased and durability is improved, just as the invention set forth in claim 1.

The invention set forth in claim 2 is any invention stated in claims 1, 4 and 5 that is characterized such that at least two of the aforementioned elastic pressure members are placed along the aforementioned shaft.

In this invention, by superposing a plurality of the elastic pressure members on the both sides, it is possible to increase flexure volume in all of the elastic pressure members and to extensively adjust the friction torque. Also, it is possible to obtain high friction torque because superposing a plurality of the elastic pressure members in the same direction increases the pressing of the pressure members against the rotating member.

The invention set forth in claim 3 is any invention stated in the claims 1, 4 and 5 or 2 that is characterized such that a lubricant-dispensing hole that supplies lubricant is formed in the aforementioned elastic pressure member.

In this invention the durability improves because of the lubricant from the lubricant-dispensing hole.

DESCRIPTION OF THE PREFERRED EMBODIMENTS

The present invention will now be described in detail according to the illustrated embodiments. In each embodiment, the same number is always given when referring to the same part, for consistency.

Embodiment 1

Figure 1:
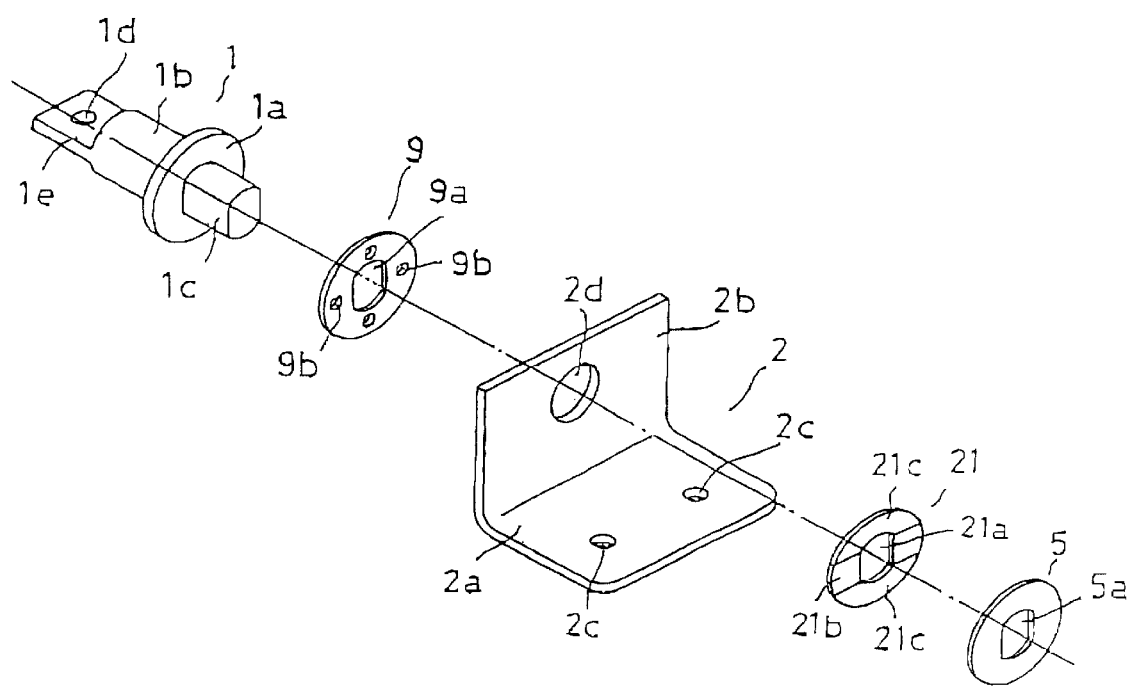
FIG. 1 is an exploded view of the embodiment 1 of the present invention.

FIG. 1 shows Embodiment 1 of the present invention, which is furnished with a shaft 1, a friction plate 9, a bracket 2 as a rotating member, an elastic pressure member 21, and a retaining plate 5. These parts are fitted to the shaft 1, in the following order: friction plate 9, bracket 2, elastic pressure member 21, and retaining plate 5.

The shaft 1 has a thick flange 1a, and a fitting-axis portion 1b and a connecting-axis portion 1c extend coaxially from this flange 1a. The fitting-axis portion 1b is to be installed onto a display panel (no drawing shown) or the like as a mating member, and a thin fitting piece 1e having fixing holes 1d for the fitting is formed at the end. The connecting-axis portion 1c is to be fit with the friction plate 9, the bracket 2, the elastic pressure member 21, and the retaining plate 5. The connecting-axis portion 1c is shaped in a non-circular shape by parallel cutting.

The bracket 2 is bent into an L-shape in such a way that a shaft-receiving-plate portion 2b bends from the fixing-plate portion 2a, which is to be connected with a supporting member (drawings not shown) such as a main body to be furnished with a display panel. Fixing holes 2c are formed in the fixing plate 2a in order to effect this connection. In the shaft-receiving-plate portion 2b, an axial hole 2d is formed and a connecting-axis portion 1c of the shaft 1 passes through this axial hole. The shaft 1 passes the axial hole 2d, which is formed into a circular shape, so as to be rotatable, whereby the shaft 1 and the bracket 2 are capable of relative rotation.

The friction plate 9 has a disk-like shape, and its outside diameter is equivalent to that of the flange 1a of the shaft 1. An axial hole 9a, whose perimeter has the same shape as the outer periphery of the connecting-axis portion 1c, is drilled out at the central portion of the friction plate 9. Around the axial hole 9a, a plural number of lubricant-dispensing holes 9b are drilled.

The lubricant-dispensing holes 9b are to be supplied with lubricants such as grease, and they are formed around the axial hole 9a so as to supply the lubricant to the surface where friction torque is produced (the contacting surface with bracket 2). Due to this lubrication, durability is improved. Instead of lubricant-retaining holes 9b, grooves or indentations can be used as lubricant-dispensing holes.

The elastic pressure member 21 has a U-shape and a belt-like flat portion 21b and rising portions 21c that bend in the same direction from both sides of the flat portion 21b; this elastic pressure member 21 hereinafter will be referred to as the "U-shaped spring 21." The rising portions 21c are arranged along the lengthwise direction of the flat portion 21b, and each rising portion 21c has a length equal to that of the flat portion 21b. In the center of the flat portion 21b, an axial hole 21a, through which the connecting-axis portion 1c of the shaft 1 passes in a condition of engagement, is drilled out. In other words, the shape of the axial hole 21a is similar to the outer periphery of the connecting-axis portion 1c. The U-shaped spring 21 is placed in such a manner that the bottom of the flat portion 21b may directly contact with the shaft-receiving-plate portion 2b of the bracket 2.

The retaining plate 5 has an axial hole 5a through which the connecting-axis portion 1c of the shaft 1 passes in a condition of engagement. This retaining plate 5 is set from the outside of the U-shaped spring 21.

To assemble an apparatus of this embodiment, the connecting-axis portion 1c passes through the above-mentioned members in the following order: friction plate 9, bracket 2, U-shaped spring 21, and retaining plate 5, to superpose them. The passing end of the connecting-axis portion 1c, which passes through the retaining plate 5, is caulked. With such caulking, the U-shaped spring 21 is pressed by the retaining plate 5 against the shaft-receiving-plate portion 2b of the bracket 2, whereby friction torque is produced between the U-shaped spring 21 and the shaft-receiving-plate portion 2b. Friction torque also is produced between the friction plate 9 and the shaft-receiving-plate portion 2b of the bracket 2. As a result, the angle between the shaft 1 and the bracket 2 can be kept at any desired degree. Also, because the lubricant-retaining holes 9b of the friction plate 9 supply lubricant to lubricate the face where the friction torque arises, durability is improved.

In this embodiment, when the retaining plate 5 presses the U-shaped spring 21 against the shaft-receiving-plate portion 2b of the bracket 2, the borders of the flat portion 21b and the rising portions 21c contact with the shaft-receiving-plate portion 2b. Because these borders are linear, when the U-shaped spring 21 and the bracket 2 are relatively rotated, a large area of contact between the U-shaped spring 21 and the bracket 2 can be obtained. Also, because both sides of the flat portion 21b contact with the bracket 2, the friction torque becomes high, and the angle of the bracket 2 can be stabilized. The action of the U-shaped spring 21 will be described in detail later in "Embodiment 4."

Figure 2:
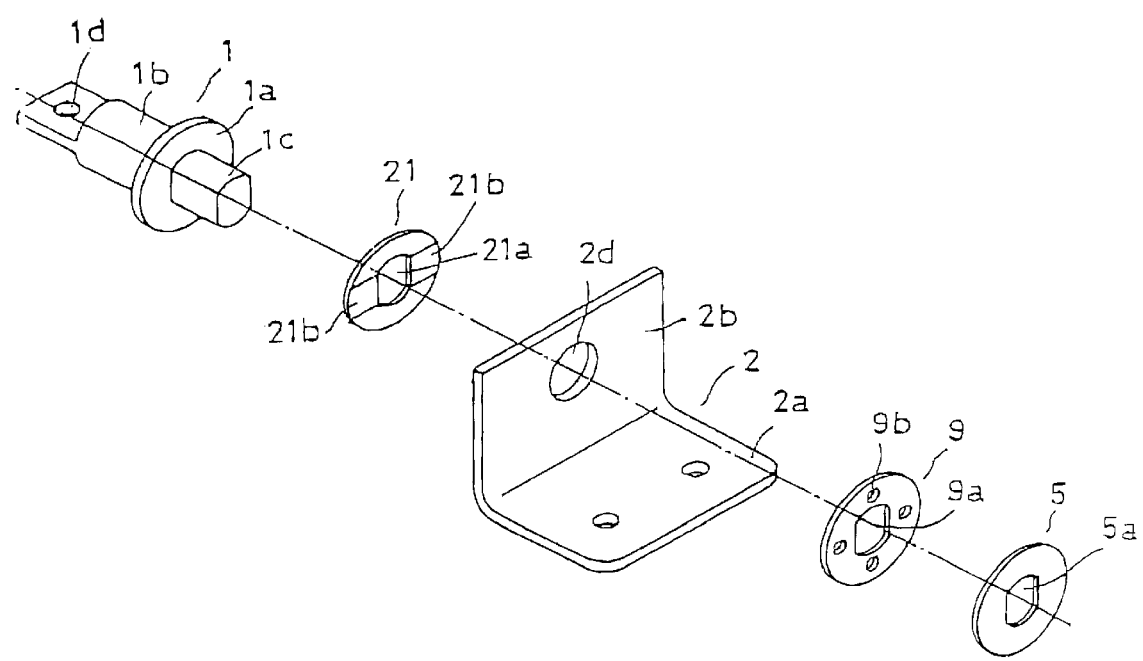
FIG. 2 is an exploded view showing a variation of Embodiment 1.

FIG. 2 shows a variation of Embodiment 1. In this embodiment, a U-shaped spring 21 is placed between a shaft 1 and a bracket 2, and a friction plate 9 is placed between the bracket 2 and a retaining plate 5. Also in this variation, by passing the connecting-axis portion 1c of the shaft 1 through the retaining plate 5, and then caulking its passing end, friction torque is produced between the U-shaped spring 21 and the shaft-receiving-plate portion 2b of the bracket 2, and between the friction plate 9 and the shaft-receiving-plate portion 2b of the bracket 2, whereby the angle between the shaft 1 and the bracket 2 can be maintained at any desired degree.

Embodiment 2

Figure 3:
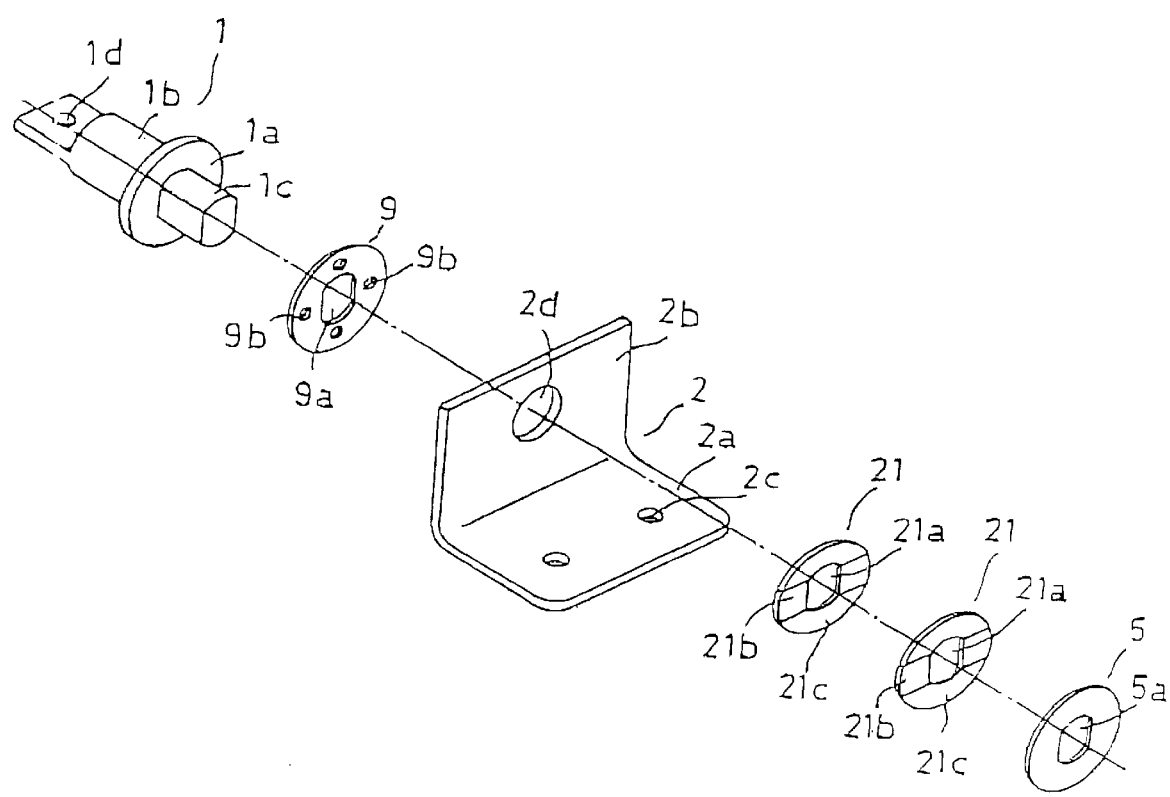
FIG. 3 is an exploded view of Embodiment 2.

FIGS. 3 shows Embodiment 2. In this embodiment, in contrast with the above-mentioned Embodiment 1, two U-shaped springs 21 are used as elastic pressure members. The two U-shaped springs 21 are placed and superposed between a bracket 2 and a retaining plate 5. In this case, the U-shaped spring 21 that is located on the side of the bracket 2 is placed in such a way that the bottom of the flat portion 21b of the U-shaped spring 21 on the side of the bracket 2 contacts the shaft-receiving-plate portion 2b of the bracket 2. In this embodiment, the rising portion 21c of one U-shaped spring 21 and the rising portion 21c of the other U-shaped spring 21 are superposed in such a way that they contact each other. Then, by caulking the passing end of the connecting-axis portion 1c that passes through the retaining plate 5, the shaft-receiving-plate portion 2b of the bracket 2 is pressed in such a way that the U-shaped springs 21, 21 are superposed.

In such an embodiment, because two U-shaped springs 21 are placed along the shaft 1, an increased amount of flexure of the U-shaped springs as a whole can be obtained, as a result of which extensive adjustment of the friction torque is possible. In this embodiment, it is also possible to superpose the U-shaped springs 21 in the same direction (if one U-shaped spring's flat portion is placed horizontally, the other U-shaped spring's flat portion is also placed horizontally, when overlaying the two U-shaped springs) and, by such superposition of the two U-shaped springs 21, high friction torque can be obtained because of an increase of the pressure of the U-shaped springs as a whole.

With the above-mentioned structure, even when the U-shaped spring's diameter or thickness is small (and so the spring constant of the U-shaped springs 21 is small), it is still possible to bring forth a desired amount of friction torque because of the use of a plurality of U-shaped springs. It should also be noted that the number of the U-shaped springs 21, as elastic pressure members, can be changed according to the designed torque as a shaft lock apparatus.

Embodiment 3

Figure 4:
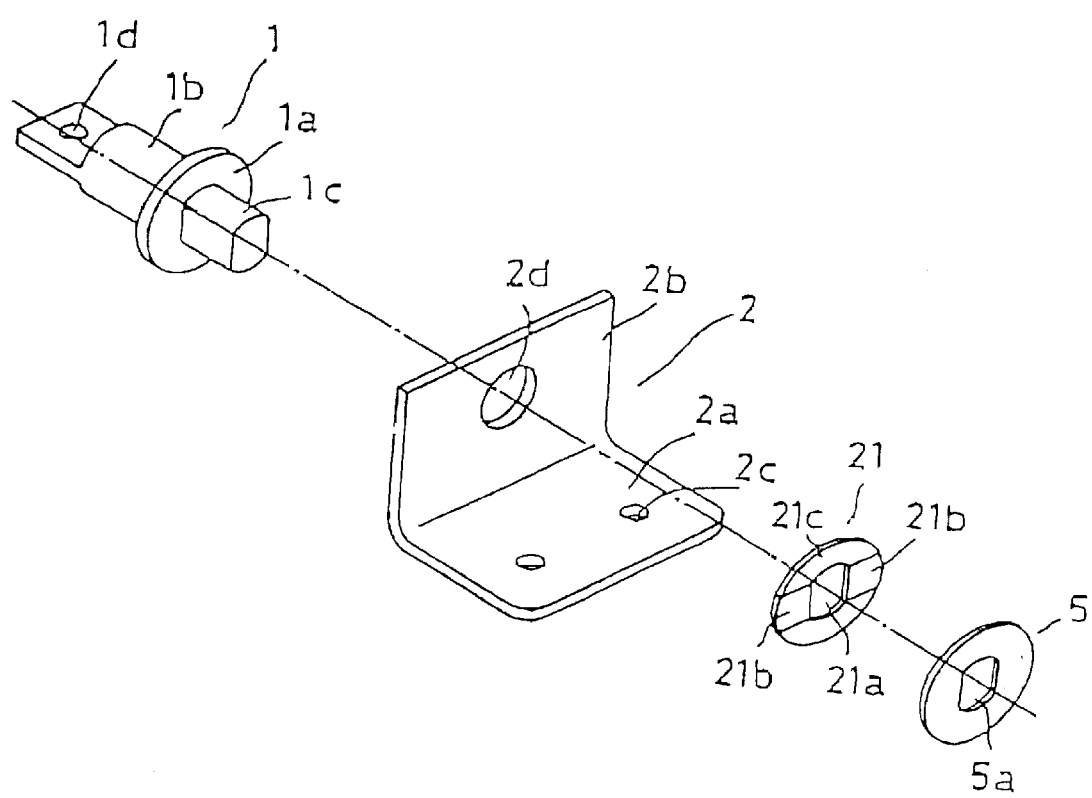
FIG. 4 is an exploded view of Embodiment 3.

FIG. 4 shows Embodiment 3. In this embodiment the friction plate 9 used in Embodiment 1 is omitted. In other words, because a connecting-axis portion 1c of the shaft 1 passes through a bracket 2, a U-shaped spring 21 and a retaining plate 5, and because the passing end of connecting-axis portion 1c is caulked, a flange 1a of the shaft 1, a shaft-receiving-plate portion 2b of the bracket 2, the U-shaped spring 21, and the retaining plate 5 are superposed, and the angle between the shaft 1 and the bracket 2 is maintained by friction torque produced by the direct pressure of the U-shaped spring 21. In this embodiment, although friction arises between the flange 1a of the shaft 1 and the shaft-receiving-plate portion 2b of the bracket 2, long-term use of this apparatus is possible if such friction is controlled so as to be small, or if the flange 1a and the shaft-receiving-plate portion 2b are made of an abrasion-proof material. In this embodiment, only a small number of parts are used, so the apparatus can be made lightweight, and it can be assembled easily.

Embodiment 4

In this embodiment, various elastic pressure members that can be used for a shaft lock apparatus of the present invention will be described.

Figure 5:
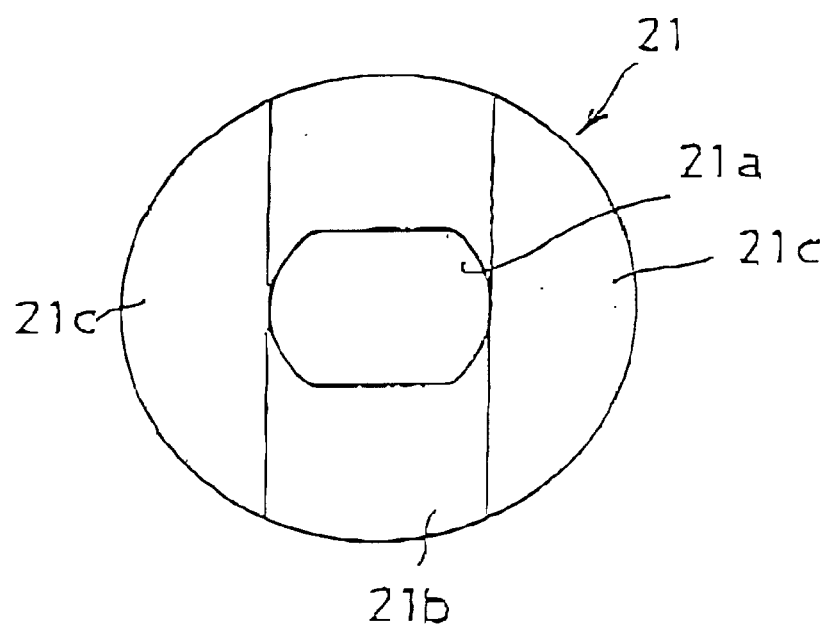
FIG. 5 illustrates a U-shaped spring in Embodiment 4. The front view of the U-shaped spring is shown in (a), and the side view of the U-shaped spring is shown in (b).
Figure 5:
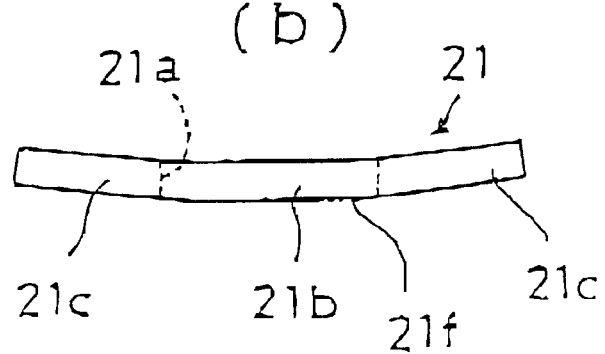
Figure 6:
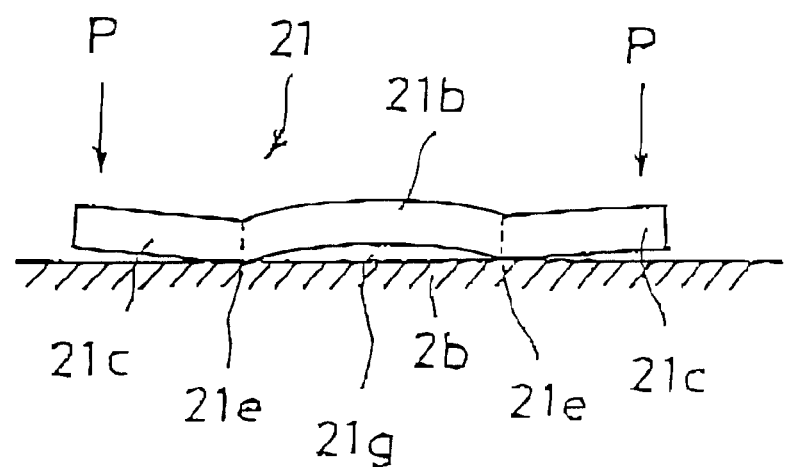
FIG. 6 is a side view of the U-shaped spring illustrated in FIG. 5, under a condition of pressure.

FIGS. 5 and 6 show a U-shaped spring 21 as an elastic pressure member. The U-shaped spring 21 has a circular shape, and it is furnished with (a) a belt-like flat portion 21b whose diameter is almost the same as that of the axial hole 21a, and (b) rising portions 21c that bend outwardly from both sides of the flat portion 21b. The rising portions 21c have the same length as that of the flat portion 21b, and they bend slantingly in the same direction from both sides of the flat portion 21b. The U-shaped spring 21 is placed in such a way that the bottom face 21f of the flat portion 21b can directly contact with the shaft-receiving-plate portion 2b of the bracket 2.

FIG. 6 shows a condition where the U-shaped spring 21 is presses when the shaft lock apparatus is assembled. Pressure force P is applied to the rising portions 21c, and by this pressure the flat portion 21b rises invertedly in a curved shape (In other words, the center of the flat portion 21b pops up, as shown in FIG. 6). Consequently, the border regions 21e of the flat portion 21b and of the rising portions 21c linearly contact with the shaft-receiving-plate portion 2b of the bracket 2. Because friction torque is produced by this linear contact between the bracket 2 and the U-shaped spring 21, the angle between the shaft 1 and the bracket 2 can be maintained.

Because the border regions 21e, which has a given linear length, in the U-shaped spring 21 contact with the shaft-receiving-plate portion 2b of the bracket 2, a given contact length can be obtained between the border regions 21e and the shaft-receiving-plate portion 2b. In addition, because the border regions 21e are positioned on both sides of the flat portion 21b, the contact length is increased so that stable friction torque can be produced. Thus, the angle of the bracket 2 can be obtained stably.

When the U-shaped spring 21 rotates relatively against the bracket 2, the U-shaped spring 21 rotates together with the shaft 1 as one united body around the connecting-axis portion 1c of the shaft 1. At the time of this rotation, the border regions 21e of the flat portion 21b and the rising portions 21c swing around the shaft 1. Therefore, because the border regions 21e contact with the bracket 2 in a circle track, the bracket 2 and the U-shaped spring 21 have a wide area of contact with each other. Thus, the friction between the bracket 2 and the U-shaped spring 21 is decreased, and their durability improves.

In this case, an opening 21g is formed between the flat portion 21b, which has risen, and the shaft-receiving-plate portion 2b of the bracket 2. Accordingly, by daubing a lubricant such as grease on the bottom face of the U-shaped spring 21, the lubricant can be retained in the opening 21g. As a result, it is possible to improve durability.

Figure 7:
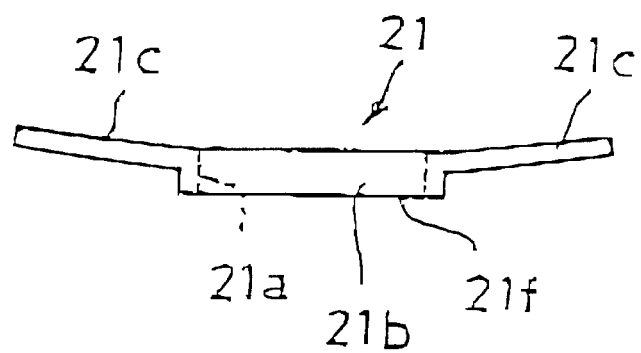
FIG. 7 is a side view of a variation of the U-shaped spring.

FIG. 7 shows a variation of the U-shaped spring 21. In this variation of the U-shaped spring 21, in contrast to the rising portions 21c, the flat portion 21b is thicker, which gives flat portion 21b more rigidity. In such a structure, the flat portion 21b, being of a high rigidity, is not formed into a curved shape even if the rising portions 21c are pressed. Consequently, the bottom face 21f of the flat portion 21b facially contacts the bracket 2, whereby friction torque arises.

Figure 8:
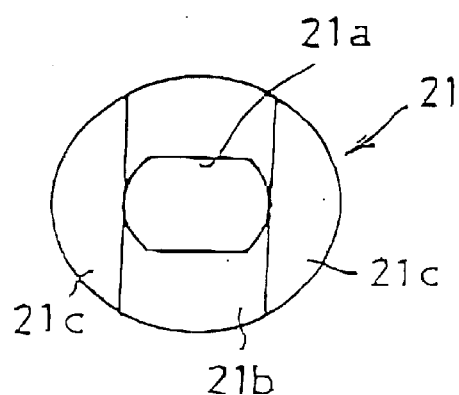
FIG. 8 illustrates another variation of the U-shaped spring, a front view of which is shown in (a), a side view of which is shown in (b), a rear view of which is shown in (c), and a partially enlarged sectional view of which is shown in (d).
Figure 8:
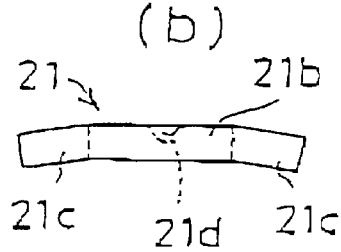
Figure 8:
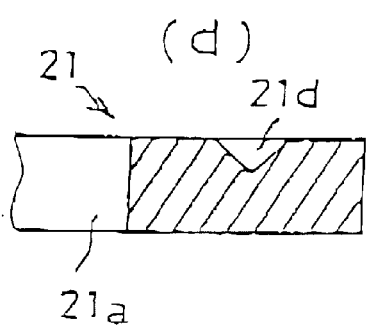
Figure 8:
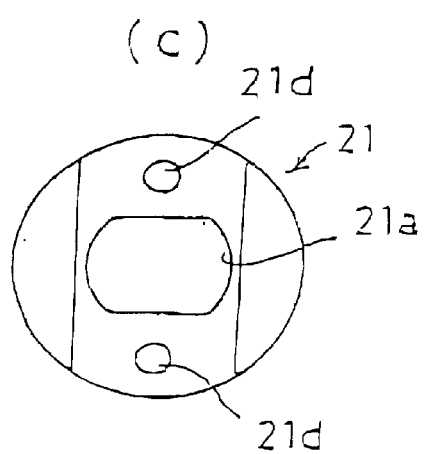

The U-shaped spring 21 shown in FIG. 8 is furnished with lubricant-dispensing holes 21d, which do not exist in the U-shaped spring 21 shown in FIG. 5. The lubricant-dispensing holes 21d are formed in such a way that their sections are shaped like a polygons, such as triangles. Also, because the lubricant-dispensing holes 21d are placed on the side of the flat portion 21b that contacts the bracket 2, the lubricant lubricates between the flat portion 21b and the bracket 2, thereby improving the durability of those parts.

Figure 9:
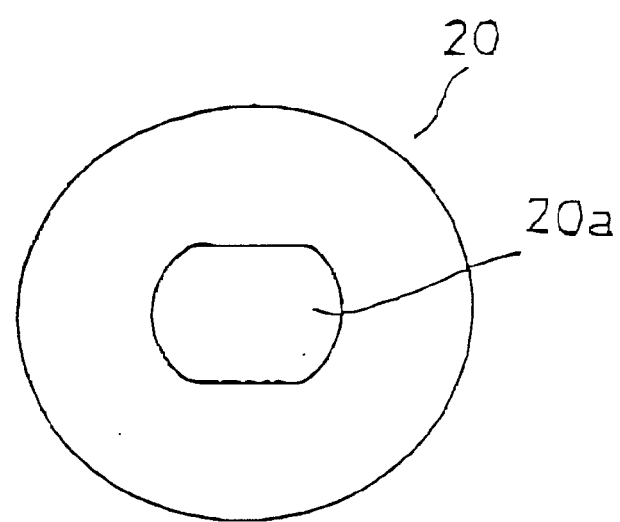
FIG. 9 illustrates a C-shaped spring in Embodiment 4; a front view of the spring is shown in (a) and a side view thereof is shown in (b).
Figure 9:
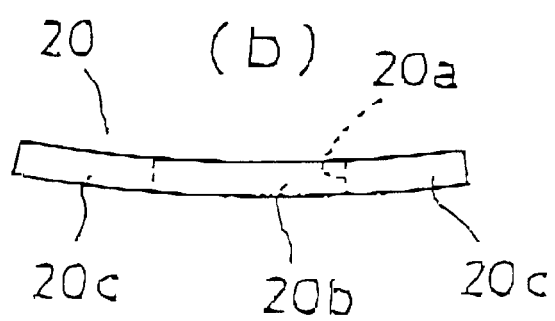
Figure 10:
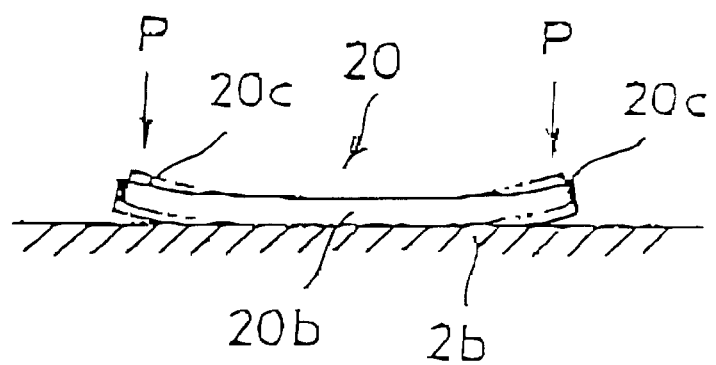
FIG. 10 is a side view of the C-shaped spring illustrated in FIG. 9, under a condition of pressure.

The elastic pressure member shown in FIGS. 9 and 10 is a C-shaped spring 20 that, when it is seen from its thickness side, has a curved shape like the letter C. In the center of the C-shaped spring 20, an axial hole 20a, through which the connecting-axis portion 1c passes in a condition of engagement, is drilled. Also, the C-shaped spring 20 is shaped like a letter C, which is gently curved in one direction. Consequently, the C-shaped spring 20 is shaped in such a way that the rising portions 20c, that bend in the same direction like a curve on both sides of the central portion 20b, are formed as one united body with the central portion 20b.

FIG. 10 shows the condition when the C-shaped spring 20 is pressed when a shaft lock apparatus is assembled. The C-shaped spring 20 is mounted so that its central portion 20b directly contacts the shaft-receiving-plate portions 2b of the bracket 2. Before force P is applied, the condition is such as is shown by the broken lines, but when force P is applied against the rising portions 20c, the rising portions 20c move toward the shaft-receiving-plate portion 2b of the bracket 2. As a result, the central portion 20b facially contacts the shaft-receiving-plate portion 2b of the bracket 2. Because this facial contact produces friction torque between the bracket 2 and the C-shaped spring 20, the angle between the shaft 1 and the bracket 2 can be stably maintained.

Also, when the shaft 1 rotates, the C-shaped spring 20 also rotates with it as one united body around the shaft 1, while contacting with the shaft 1 in a circular track. As a result, abrasion between the parts is decreased and their durability is improved.

Figure 11:
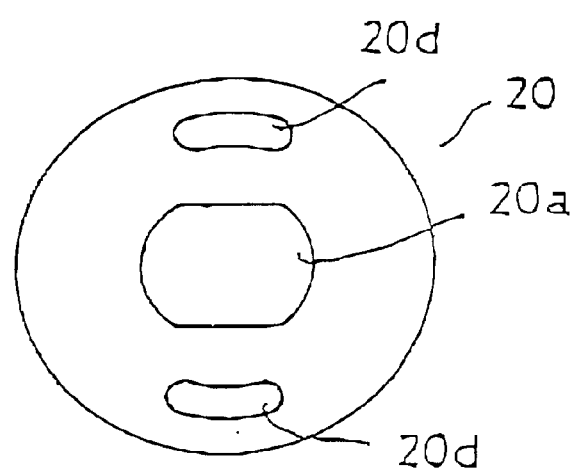
FIG. 11 illustrates a variation of the C-shaped spring; a front view of the spring is shown in (a) and a side view thereof is shown in (b).
Figure 11:
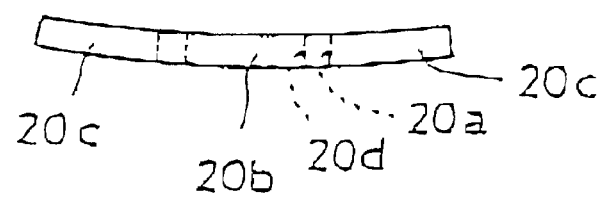

The C-shaped spring 20 shown in FIG. 11 is furnished with lubricant-dispensing holes 20d, which do not exist in the C-shaped spring 20 shown in FIG. 9. The lubricant-dispensing holes 20d are made of elliptic drilled holes that are drilled so as to be opposite to each other across the axial hole 20a. The lubricant-dispensing holes 20d are formed so as to be located in the central portion 20b. Thus the lubricant-dispensing holes 20d are furnished in the C-shaped spring 20, whereby the lubrication of the lubricant functions effectively, and the durability of the parts is further improved.

Embodiment 5

Figure 12:
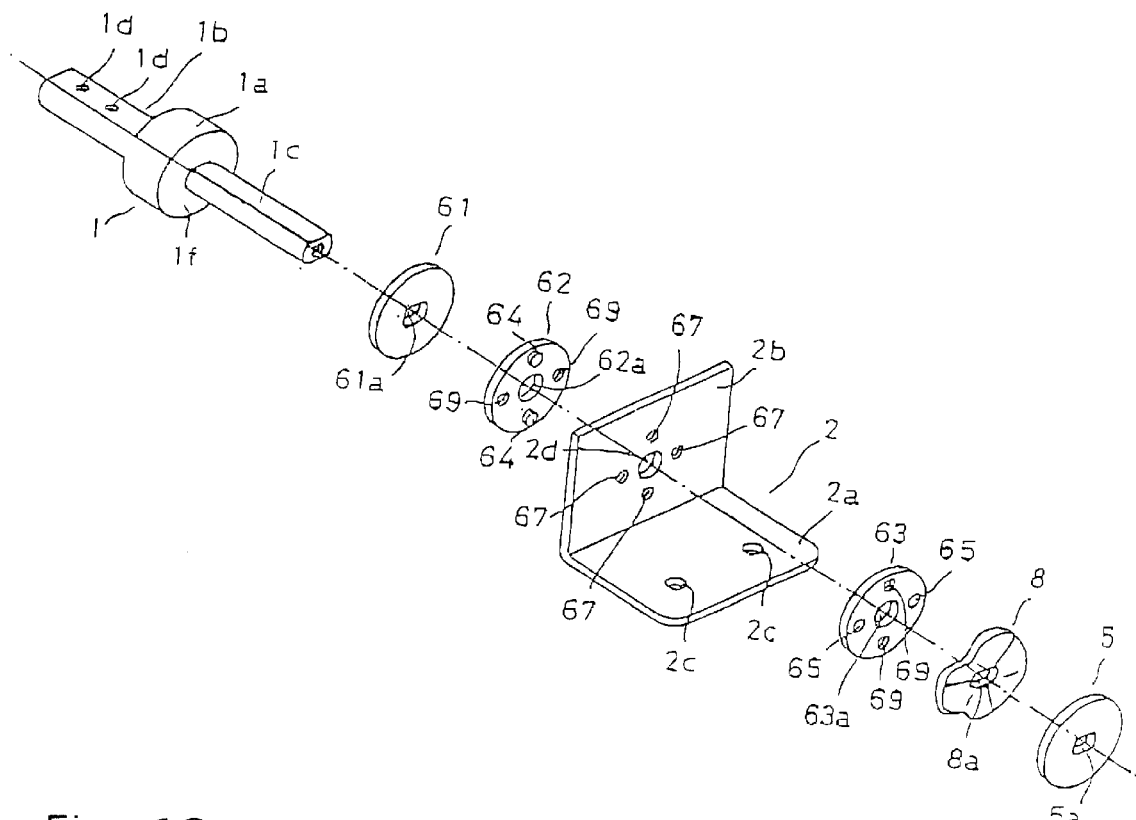
FIG. 12 is an exploded view of Embodiment 5.
Figure 13:
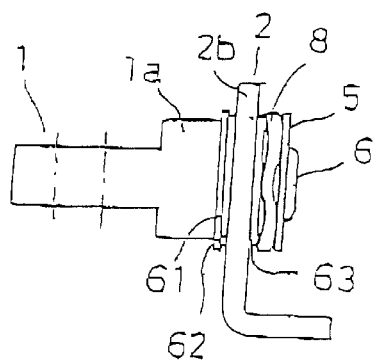
FIG. 13 is a front view of Embodiment 5 under an assembled condition.

FIGS. 12 and 13 show a shaft lock apparatus of Embodiment 5. In this shaft lock apparatus, a first friction plate 61, a second friction plate 62, and a third friction plate 63 are used. These friction plates 61, 62, and 63 are formed in the shape of a circular flat plates of similar diameters. The first friction plate 61 and the second friction plate 62 are set between the shaft 1 and the bracket 2. In this case, the first friction plate 61 is placed on the inner side of the shaft 1 and the second friction plate 62 is placed on the outer side of the bracket 2, and the third friction plate 63 is placed to sandwich the bracket 2 between these friction plates 61 and 62 on one side and itself (the third friction plate 63) on the other.

The second friction plate 62 includes two engaging prominences 64, which are formed opposite each other (180 degrees apart) on its side that faces the bracket 2. Similarly, the third friction plate 63, which sandwiches the bracket 2 between the second friction plate 62 and itself (the third friction plate 63), includes two engaging prominences 65, which are formed opposite each other (180 degrees apart) on its side that faces the bracket 2, but which are formed so as to cross at right angle (to be perpendicular to) the engaging prominences 64 of the second friction plate 62.

In order to correspond with the foregoing, four engaging holes 67 are formed at an interval of 90 degrees around the axial hole 2d in the shaft-receiving-plate portion 2b of the bracket 2. Each of these engaging holes 67 is to be engaged by one of the engaging prominences 64 or 65 and, by such engagement, the friction plates 62 63 are fixed on the bracket 2.

Also, both the second friction plate 62 and the third friction plate 63 includes two lubricant-dispensing holes 69, which are drilled holes. The lubricant-dispensing holes 69 are located between the engaging prominences 64 and 65 of the friction plates 62 and 63, respectively. It should also be noted that in the centers of the second friction plate 62 and the third friction plate 63 are circular-shaped axial holes 62a and 63a, respectively, through which the connecting-axis portion 1c of the shaft 1 passes in a rotatable condition.

The first friction plate 61 located on the inner side of the shaft 1 is a flat plate having no engaging prominences or lubricant-dispensing holes such as those described above. One flat side of this first friction plate 61 contacts the flat face 1f of the shaft 1, while the other side contacts the second friction plate 62. By such arrangement, the first friction plate 61 covers the lubricant-dispensing holes 69 of the second friction plate 62.

Through the center of the first friction plate 61 is the axial hole 61a, but this axial hole 61a has a non-circular shape that is the same as the shape of the connecting-axis portion 1c of the shaft 1. Accordingly, the connecting-axis portion 1c passes through the axial hole 61a in a condition of engagement, whereby the first friction plate 61, the rotation of which is bound on the shaft 1, rotates together with the shaft 1 as one united body.

In this embodiment, a wave spring 8, as an elastic pressure member, is placed between the third friction plate 63 and the retaining plate 5. In the wave spring 8, the axial hole 8a has a non-circular shape that is the same shape as the connecting-axis portion 1c of the shaft 1. The connecting-axis portion 1c of the shaft 1 passes through the axial hole 8a of the wave spring 8, whereby its rotation is bound by the connecting-axis portion 1c so that it rotates together with the shaft 1 as one united body. It should also be noted that the axial hole 5a of the retaining plate 5 has a non-circular shape and that, by engagement with the connecting-axis portion 1c of the shaft 1, it rotates together with the shaft 1 as one united body.

FIG. 13 shows a condition that a shaft lock apparatus of this embodiment is assembled, where the connecting-axis portion 1c of the shaft 1 passes through the first friction plate 61, the second friction plate 62, the bracket 2, the third friction plate 63, the wave spring 8 and the retaining plate 5 in such an order and a pressure is to be brought forth in the wave spring 8 by caulking this passing-end portion. In FIG. 13, the symbol 6 denotes the caulking portion, which is formed by caulking the passing-end portion of the shaft 1.

In the assembled condition of this embodiment, the first and the second friction plates 62 and 63 are joined as one united body with the bracket 2, while the first friction plate 61, the wave spring 8, and the retaining plate 5 are joined as one united body with the shaft 1. In this assembled condition, in a relative rotation of the shaft 1 and the bracket 2, friction torque is produced on the contacting faces of the first friction plate 61 and the second friction plate 62 and on the contacting faces of the third friction face 63 and the wave spring 8. Therefore, the angle between the shaft 1 and the bracket 2 can be maintained at any desired degree.

In this embodiment, the third friction plate 63 is placed between the bracket 2 and the wave spring 8 in a condition such that it is as one united body with the bracket 2, whereby the wave spring 8 does not directly contact the bracket 2 and, therefore, abrasion of the bracket 2 can be prevented. Consequently, bracket 2 does not need to have great strength (or durability), because its abrasion can be prevented for the above-mentioned reason, and the bracket 2 can be made of inexpensive material. For example, if the friction plates 61, 62, and 63 are made of stainless steel or phosphor bronze, SPCC can be used for the bracket 2, which reduces its cost, and enables greater choice of the material used to make the bracket 2.

Also, in this embodiment, because the first friction plate 61 and the second friction plate 62 are flat, these friction plates 61 and 62 are capable of contacting each other in a condition of close adhesion. Accordingly, the first friction plate 61 can cover the lubricant-dispensing hole 69 of the second friction plate 62 so that the lubricant does not leak out of the lubricant-dispensing hole 69. Therefore, lubrication with the lubricant can be controlled. By this lubrication, abrasion of the friction plates 61 and 62 can be controlled. Also, alien substances do not get into the region between the first friction plate 61 and the second friction plate 62, where friction torque is produced, whereby it is possible to adjust the tilt angle without troubled rotation.

It should also be noted that in this embodiment it is possible to place a friction plate only on the side of the wave spring 8 and to omit the friction plates 61 and 62 that in the foregoing description are placed between the bracket 2 and the shaft 1. Also, it is possible to form engaging holes in the second friction plate 62 and the third friction plate 63 and to form engaging prominences on the bracket 2, so as to fix the friction plates 62 and 63 on the bracket 2. In addition, other fixing structures are also possible.

Embodiment 6

FIGS. 14 to 20 show an embodiment of the angle-adjustment device to which the above-mentioned embodiments are applied. The angle-adjustment device is furnished with a base 30, a base bracket 31, and two tilt brackets 32 and 33. The base 30 is to be fixed on a supporting stand (drawing not shown) that supports a display panel or the like. The base bracket 31 is fitted on this base 30 so as to be rotatable. From both ends of the base bracket 31, supporting-plate portions 31a and 31b bend upright, and the tilt brackets 32 and 33 are so fitted on the supporting-plate portions 31a and 31b as to be rotatable. The tilt brackets 32 and 33 are to be connected with the end portions of a display panel or the like.

The base 30 and the base bracket 31 are connected through a shaft lock apparatus 40, and the base bracket 31 and each of the tilt brackets 32 and 33 are connected through a shaft lock apparatus 50. For these shaft lock apparatuses 40 and 50, any of the aforementioned Embodiments 1 to 5 can be used.

In this embodiment, the shaft lock apparatus 40, which connects the base 30 with the base bracket 31, is furnished with a shaft 41 that is fixed on the base 30 and with a friction plate 42 through which the shaft 41 passes in a condition of bound rotation. Through the base bracket 31 the shaft 41 passes in a rotatable condition. The shaft on the side of the base bracket 31 passes through an elastic pressure member 25, which is shown in FIGS. 5 to 13 in a condition of bound rotation, and, in addition, passes through a retaining plate 43 in a condition of bound rotation, and is caulked at the end portion. Therefore, when the base bracket 31 is operated to rotate, the base bracket 31 can be halted at a desired degree within the horizontal level.

Figure 14:
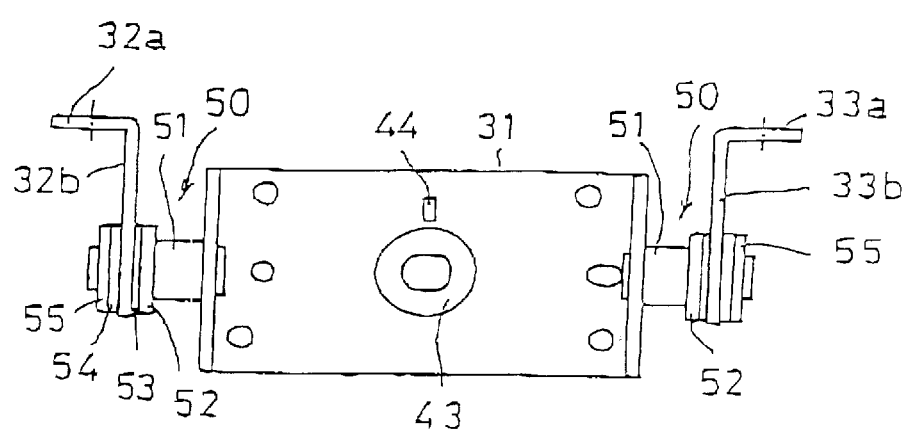
FIG. 14 is a plan view of an angle-adjusting device.
Figure 15:
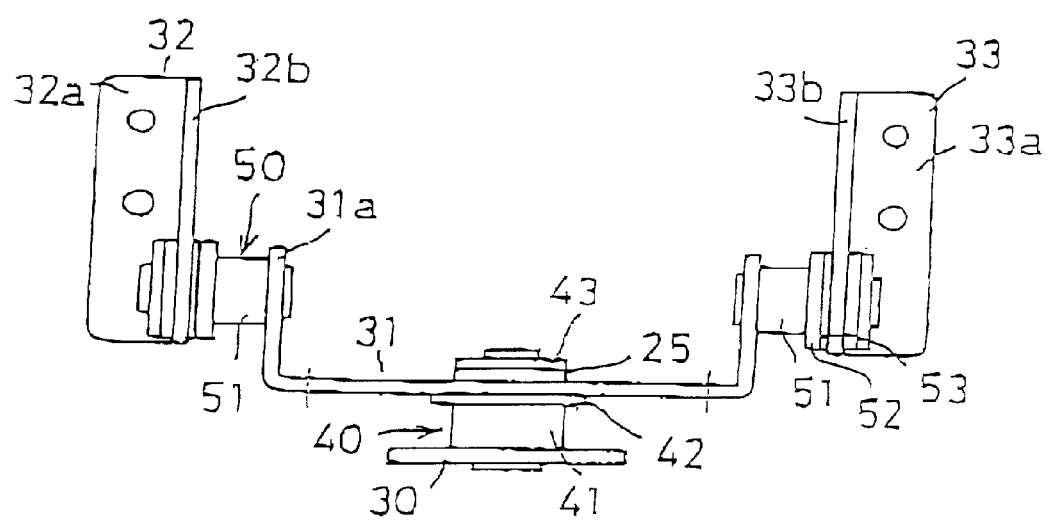
FIG. 15 is a front view of the angle-adjusting device.
Figure 16:
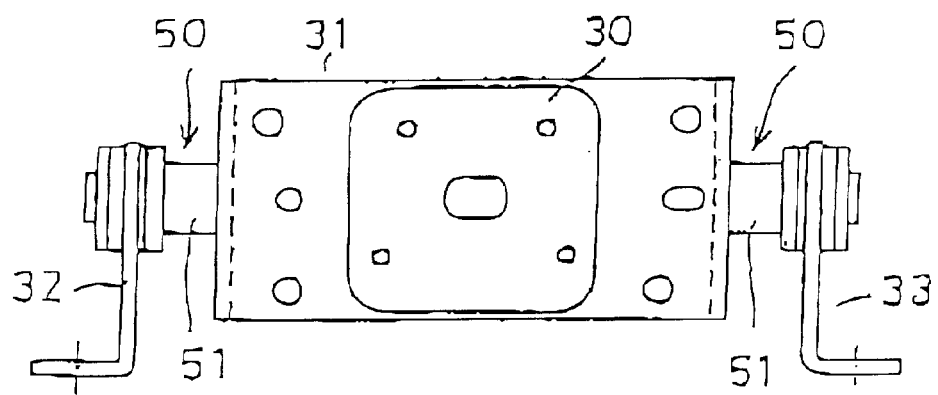
FIG. 16 is a bottom plan view of the angle-adjusting device.
Figure 17:
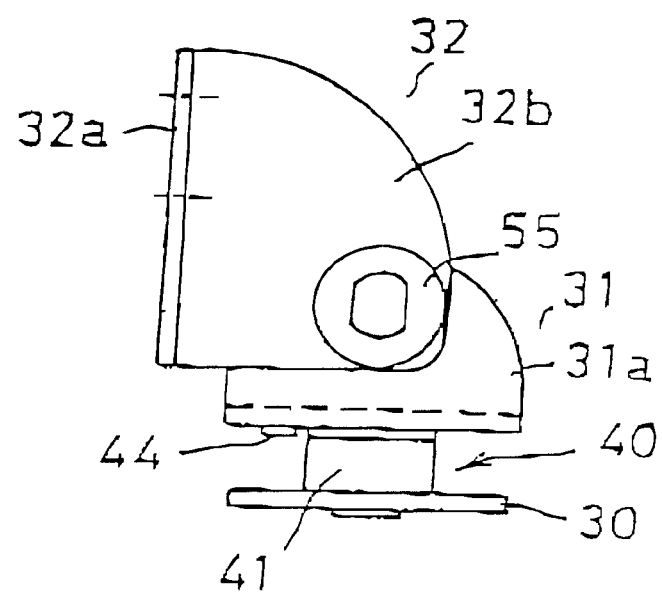
FIG. 17 is a left side view of the angle-adjusting device.
Figure 18:
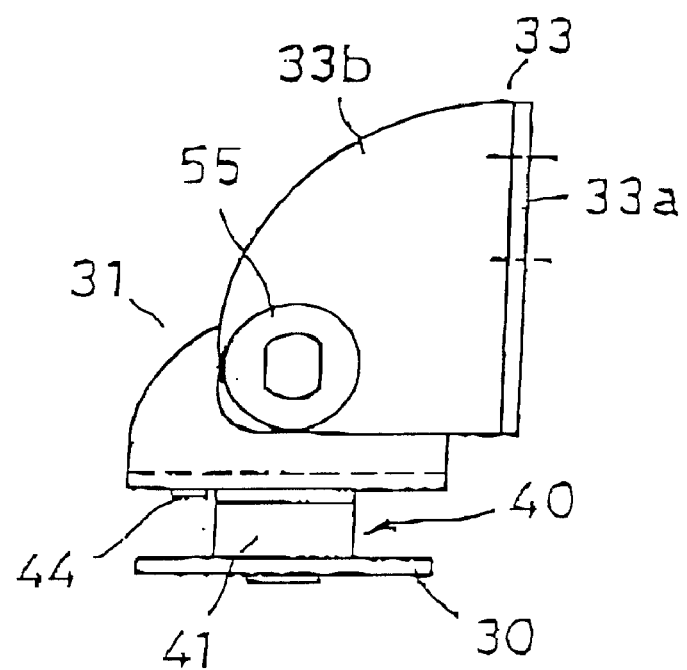
FIG. 18 is a right side view of the angle-adjusting device.

Rotation of the base bracket 31 is to be regulated within a certain range of angle. Therefore, in the bottom face of the base bracket 31, as is shown in FIGS. 14 and 17, a stopper protuberance 44 protrudes. The stopper protuberance 44 can be formed by half-blanking against the base bracket 31 by a press.

Figure 20:
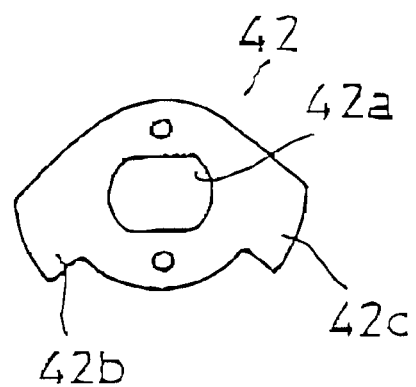
FIG. 20 is a plan view of a friction plate of an angle-adjusting device.
Figure 21:
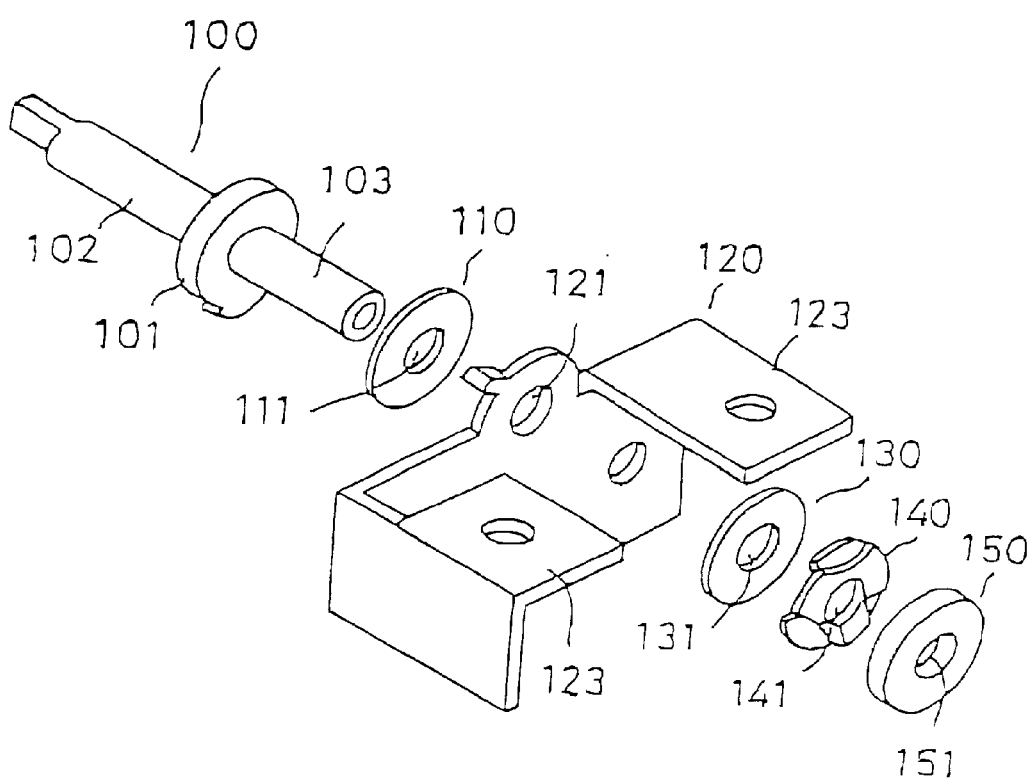
FIG. 21 is an exploded view of a conventional shaft lock apparatus.

FIG. 20 shows a friction plate 42 facing this stopper protuberance 44. The friction plate 42 includes a non-circular-shaped axial hole 42a, which is engaged with the shaft 41, is formed. The friction plate 42 is a plate shaped like a Japanese hiragana letter "he" [i.e., shaped like a Greek capital letter Λ (lambda)] and has stopper plates 42b and 42c, which slantingly protrude toward the stopper protuberance 44. The space between the stopper plates 42b and 42c is the rotatability range of the base bracket 31. The rotation of the base bracket 31 is stopped by the stopper protuberance 44 contacting either of the stopper plates 42b or 42c, caused by the rotation of the base bracket 31. As a result, the angle of a display panel or the like can be adjusted within the horizontal level.

In this embodiment, the shaft lock apparatus 50 connecting the base bracket 31 with the tilt brackets 32 and 33 is furnished with a tilt shaft 51 that is fixed on the supporting-plate portions 31a and 31b of the base bracket 31, and with a spacer 52, a friction plate 53, an elastic pressure member 54, and a retaining plate 55, all of which are fitted on the tilt shaft 51. Each of the tilt brackets 32 and 33 is fitted in a condition such that the shaft-receiving-plate portions 32b and 33b thereof are between the friction plate 53 and the elastic pressure member 54. It should also be noted that the U-shaped spring 21 or the C-shaped spring 20 shown in FIGS. 5 to 11 can be used as the elastic pressure member 54.

Figure 19:
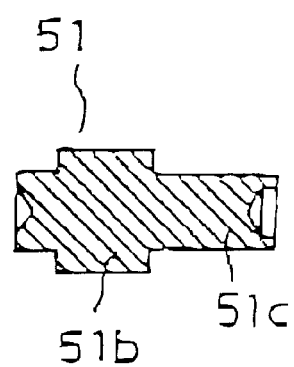
FIG. 19 is a sectional view of a tilt shaft used in a shaft lock apparatus of an angle-adjusting device.

FIG. 19 shows the tilt shaft 51 to be composed of a fitting-axis portion 51b, having a circular shape, and a connecting-axis portion 51c, having a non-circular shape. The fitting-axis portion 51b is shaped so as to be somewhat larger in its diameter is than the diameter of the connecting-axis portion 51c. The spacer 52 is fitted on the connecting-axis portion 51c in a condition of bound rotation, and the friction plate 53 contacts this spacer 52.

In such a structure, the spacer 52 is capable of working as is the flange 1a of the shaft 1 shown in FIGS. 1 and 2. Accordingly, as a shaft lock apparatus 50 of this embodiment, Embodiment 1 as shown in FIG. 1 can be used as it is only by using the tilt shaft 51 instead of the shaft 1. As a result, it is sufficient is the connecting-axis portion 51c is somewhat smaller in its diameter than the diameter of the fitting-axis portion 51b, which makes the shape of the tilt shaft 51 simpler and hence able to be manufactured more easily and more inexpensively.

In this embodiment, it is possible to adjust the tilt angle of the display panel by rotating the display panel or the like back and forth after connecting the fixing-plate portions 32a and 33a of the tilt brackets 32 and 33 with the end portions of the display panel or the like. In this case, because the tilt brackets 32 and 33 support the end portions of the display panel or the like with the right and left ends thereof, respectively, the manipulating force is well dispersed on both sides. Therefore, it is possible to rotate the display panel or the like and to maintain the angle thereof.

The present invention is not restricted within the aforementioned embodiments, but is capable of being varied. For example, it is possible to assemble a shaft lock apparatus by engagement by a nut, not by caulking the passing-end portion of the shaft 1, which in this case is possible if a male screw is formed in the outer surface of the end portion of the shaft 1. It is also possible to furnish two or more elastic pressure portions, or to furnish a single elastic pressure member, or to omit the friction plate 9.

Possibility of Industrial Utilization

As described above, according to the invention of claim 1, as an elastic pressure member rotates together with the shaft as one united body, it is possible to stabilize the friction torque and, in addition, to enable a simple structure that has a smaller number of parts than a conventional shaft lock apparatus, which enables the apparatus to be assembled more easily. Also, because of the use of either (a) an elastic pressure member that has a belt-like flat portion of a specified width, and rising portions that bend in the same direction from both sides of the flat portion, and whose flat portion is arranged in a direction such that it directly contacts the rotating member, or (b) an elastic pressure member that has a curved shape when it is seen from its thickness side, and whose central part is arranged to directly contact the rotating member; the rotating member can be maintained at a desired angle, and the elastic pressure member can contact the rotating member over a large area. As a result, the abrasion of the rotating member and the elastic pressure member is decreased, and thus their durability improves. In addition, because the retaining plate presses the elastic pressure member against the rotating member, the friction torque of the elastic pressure member can effectively act upon the rotating member.

According to the invention of claim 4, as an elastic pressure member and a friction plate rotate together with the shaft to produce friction torque between the elastic pressure member and the rotating member and between the friction plate and the rotating member, it is possible to stabilize the friction torque with a structure that is simpler and has a smaller number of parts than a conventional shaft lock apparatus; in addition, the friction plate improves the durability. Also, because of the use of either (a) an elastic pressure member that has a belt-like flat portion of a specified width, and rising portions that bend in the same direction from both sides of the flat portion, and whose flat portion is arranged in a direction such that it directly contacts the rotating member, or (b) an elastic pressure member that has a curved shape when it is seen from its thickness side, and whose central part is arranged to directly contact with the rotating member; the rotating member can be maintained at a desired angle, and the elastic pressure member can contact the rotating member over a large area. As a result, the abrasion of the rotating member and the elastic pressure member is decreased, and their durability improves. In addition, because the retaining plate presses the elastic pressure member against the rotating member, a friction torque of the elastic pressure member can effectively act upon the rotating member.

According to the invention of claim 5, as an elastic pressure member presses against the rotating member, it is possible—by fitting a friction plate, a rotating member, an elastic pressure member, and a retaining plate on the shaft in that order—to keep the angle between the rotating member and the shaft at any desired degree and to stabilize the friction torque; in addition, it is possible to assemble the apparatus more easily. Also, because of the use of either (a) an elastic pressure member that has a belt-like flat portion of a specified width, and rising portions that bend in the same direction from both sides of the flat portion, and whose flat portion is arranged in a direction such that it directly contacts the rotating member, or (b) an elastic pressure member that has a curved shape when it is seen from its thickness side, and whose central part is arranged to directly contact the rotating member; the rotating member can be maintained at a desired angle, and the elastic pressure member can contact the rotating member over a large area. As a result, the abrasion of the rotating member and the elastic pressure member is decreased, and their durability improves. In addition, because the end of the shaft that passes through the retaining plate is caulked and mounted, the friction torque of the elastic pressure member is stabilized.

According to the invention of claim 2, it is possible to increase the flexure volume of the elastic pressure members or to increase the friction torque, along with obtaining the effects of claims 1 to 5.

According to the invention of claim 3, the durability of the parts improves because of lubrication by the lubricant.

What is claimed is:

1. A shaft lock apparatus characterized such that it is furnished with (1) a rotating member through which a shaft passes in a condition of free rotation; (2) an elastic pressure member that is shaped in a way to have a belt-like flat portion of a specified width and rising portions that bend in the same direction from both sides of the flat portion and arranged in a direction so as to directly contact the rotating member at the flat portion thereof, or (3) an elastic pressure member that is shaped to be curved when seen from its thickness side and that is arranged so that its central part directly contacts the rotating member and so that said elastic pressure member through which said shaft passes in a condition of bound rotation and that keeps the angle between the rotating member and the shaft at any desired degree by pressing against the rotating member; and (4) a retaining plate, through which the shaft passes in a condition of bound rotation, and that presses the elastic pressure member against the rotating member.

2. A shaft lock apparatus, as described in claim 1, that is characterized such that at least two or more elastic pressure members are placed along the aforementioned shaft.

3. A shaft lock apparatus, as described in claim 1, that is characterized such that lubricant-dispensing holes that retain a lubricant are formed in the aforementioned elastic pressure member.

4. A shaft lock apparatus characterized such that it is furnished with (1) a rotating member through which the shaft passes in a condition of free rotation; with an elastic pressure member that is shaped in a way as to have a belt-like flat portion of a specified width and rising portions that bend in the same direction from both sides of the flat portion and which are arranged in a direction so as to directly contact with the rotating member at the flat portion thereof, or (2) an elastic pressure member that is shaped so as to be curved when seen from its thickness side and arranged so as to directly contact the rotating member by the central part thereof, with said elastic pressure member through which said shaft passes in a condition of bound rotation and that keeps the angle between the rotating member and the shaft at any desired degree by pressing against the rotating member; with a friction plate through which the aforementioned shaft passes in a condition of bound rotation to be superposed on the aforementioned rotating member; and (3) a retaining plate through which the aforementioned shaft passes in a condition of bound rotation and that presses the elastic pressure member against the rotating member.

5. A shaft lock apparatus characterized such that it is furnished with (1) a friction plate through which the shaft passes in a condition of bound rotation; (2) a rotating member through which the shaft passes in a condition of free rotation; (3) an elastic pressure member that is shaped in such a way as to have a belt-like flat portion of a specified width and rising portions that bend in the same direction from both sides of the flat portion and that are arranged in a direction so as to directly contact the rotating member at the flat portion thereof, or (4) an elastic pressure member that is shaped so as to be curved when seen from its thickness side and that is arranged so to directly contact the rotating member at the central part thereof, with said elastic pressure member through which the shaft passes in a condition of bound rotation; and (5) a retaining plate through which the shaft passes in a condition of bound rotation; all of which are fitted on the shaft in the foregoing order so as to be superposed, and characterized such that, by caulking the passing end of the shaft that is passing through the aforementioned retaining plate, the elastic pressure member presses against the rotating member so as to keep the angle between the rotating member and the shaft at any desired degree.

* * * * *